United States Patent
Matsui

(10) Patent No.: US 9,986,121 B2
(45) Date of Patent: May 29, 2018

(54) IMAGE FORMING APPARATUS AND CONDENSATION REDUCTION METHOD THAT REMOVE CONDENSATION WITH SIMPLE CONFIGURATION, AND RECORDING MEDIUM THEREFOR

(71) Applicant: Kyocera Document Solutions Inc., Osaka (JP)

(72) Inventor: Shinya Matsui, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days. days.

(21) Appl. No.: 15/445,936

(22) Filed: Feb. 28, 2017

(65) Prior Publication Data

US 2017/0257511 A1 Sep. 7, 2017

(30) Foreign Application Priority Data

Mar. 7, 2016 (JP) .................. 2016-043966

(51) Int. Cl.
*G03G 21/20* (2006.01)
*G03G 15/20* (2006.01)
*H04N 1/00* (2006.01)
*G03G 15/00* (2006.01)

(52) U.S. Cl.
CPC ......... *H04N 1/00992* (2013.01); *G03G 15/50* (2013.01); *H04N 1/00909* (2013.01); *H04N 1/00931* (2013.01); *H04N 1/00986* (2013.01); *H04N 2201/0081* (2013.01); *H04N 2201/0082* (2013.01)

(58) Field of Classification Search
CPC .............. G03G 15/50; H04N 1/00992; H04N 1/00931; H04N 1/00986; H04N 2201/0081; H04N 2201/0082; H04N 1/00909
USPC ......................................................... 399/97
See application file for complete search history.

(56) References Cited

FOREIGN PATENT DOCUMENTS

| JP | 2003216008 A | * | 7/2003 |
| JP | 2003295738 A | * | 10/2003 |
| JP | 2004109459 A | * | 4/2004 |

* cited by examiner

*Primary Examiner* — Susan Lee
(74) *Attorney, Agent, or Firm* — James W. Judge

(57) ABSTRACT

An image forming apparatus includes an image reading unit, a fixing unit, a time setting unit, and a control unit. The image reading unit moves a running body having an onboard optical system. The fixing unit heats toner transferred onto the print medium and applies pressure on the heated toner with respect to the print medium to fix the toner. The time setting unit sets an estimated time when use of the image forming apparatus starts. The control unit controls the image reading unit, the fixing unit, and the time setting unit. The control unit, prior to the set estimated start-of-use time by a predetermined period set in advance, activates the image reading unit to detect whether condensation has occurred in the optical system, heats the fixing unit in response to a detection of occurrence of condensation, and stops the heating before the estimated start-of-use time.

10 Claims, 4 Drawing Sheets ns in this
IMAGE FORMING APPARATUS AND CONDENSATION REDUCTION METHOD THAT REMOVE CONDENSATION WITH SIMPLE CONFIGURATION, AND RECORDING MEDIUM THEREFOR

INCORPORATION BY REFERENCE

This application is based upon, and claims the benefit of priority from, corresponding Japanese Patent Application No. 2016-043966 filed in the Japan Patent Office on Mar. 7, 2016, the entire contents of which are incorporated herein by reference.

BACKGROUND

Unless otherwise indicated herein, the description in this section is not prior art to the claims in this application and is not admitted to be prior art by inclusion in this section.

A typical image forming apparatus includes an image reading apparatus including a light source, an optical system, and an image sensor. In the image reading apparatus, a mirror and a lens are cooled when they are unused during night. To use this on the following morning, when a power supply is turned on, warm air including water vapor flows into the apparatus to touch these mirror and lens. Thus condensation possibly occurs. If the condensation occurs on a surface of the optical system and similar unit, an influence of water droplets causes degraded image. To solve such problem, there is proposed a technique where a heating process is performed in a state of restricted use of the image forming apparatus in response to a detection of condensation, and the technique releases the use restriction in response to a determination of condensation removal.

SUMMARY

An image forming apparatus according to one aspect of the disclosure forms an image on a print medium. The image forming apparatus includes an image reading unit, a fixing unit, a time setting unit, and a control unit. The image reading unit includes a scanning mechanism that performs scanning by moving a running body having an onboard optical system. The fixing unit heats toner transferred onto the print medium and applies pressure on the heated toner with respect to the print medium to fix the toner. The time setting unit sets an estimated time when use of the image forming apparatus starts. The control unit controls the image reading unit, the fixing unit, and the time setting unit. The control unit, prior to the set estimated start-of-use time by a predetermined period set in advance, activates the image reading unit to detect whether condensation has occurred in the optical system, heats the fixing unit in response to a detection of occurrence of condensation, and stops the heating before the estimated start-of-use time.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
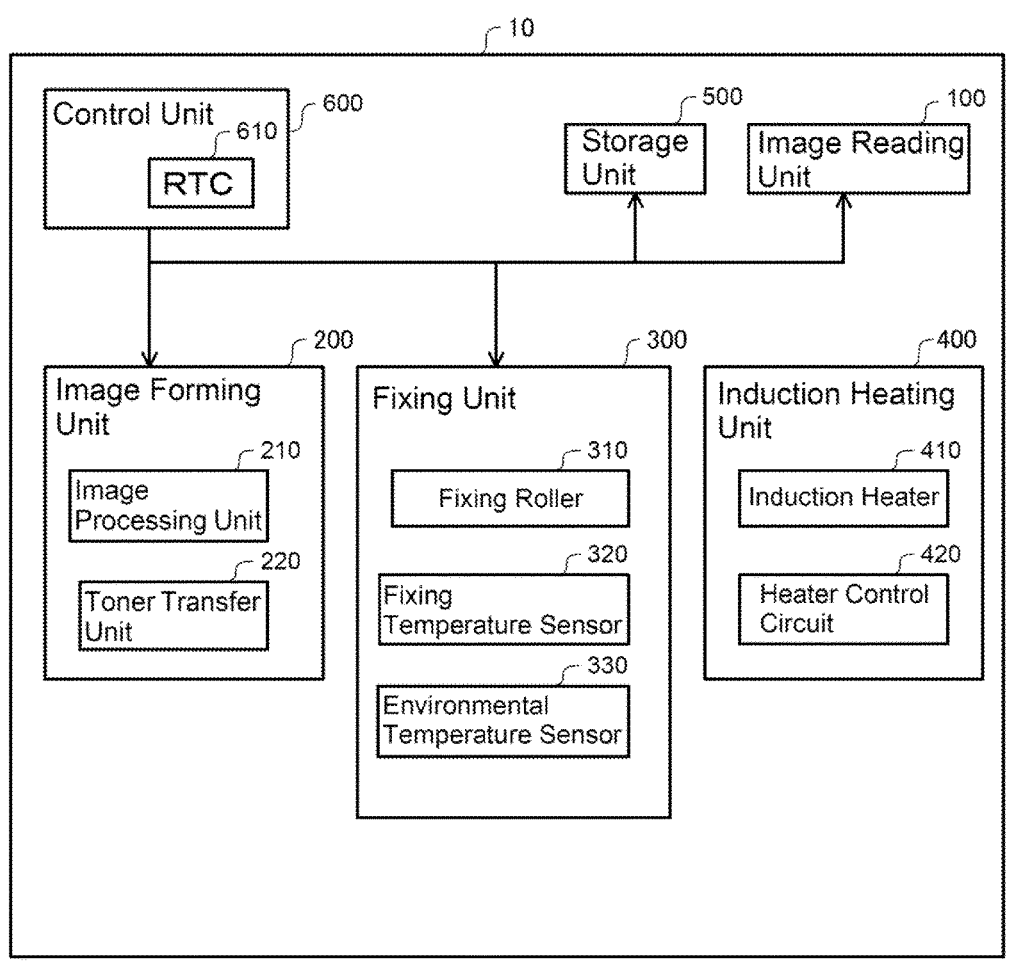
FIG. 1 illustrates a block diagram of an overall configuration of an image forming apparatus according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes a configuration for implementing the disclosure (hereinafter referred to as "embodiment") with reference to the drawings.

FIG. 1 illustrates a functional configuration of an image forming apparatus 10 according to one embodiment of the disclosure. The image forming apparatus 10 includes an image reading unit 100, an image forming unit 200, a fixing unit 300, an induction heating unit 400, a storage unit 500, and a control unit 600. While the detail is described later, the image reading unit 100 reads an image from an original document to generate image data. The image forming unit 200 includes an image processing unit 210 and a toner transfer unit 220. The image processing unit 210 processes the image data in accordance with a print setting. The toner transfer unit 220 transfers a toner on a print medium based on the processed image data.

The fixing unit 300 includes a fixing roller 310, a fixing temperature sensor 320, and an environmental temperature sensor 330. The fixing roller 310 fixes the toner transferred onto the print medium under a high temperature. The fixing temperature sensor 320 measures a surface temperature of the fixing roller 310. The environmental temperature sensor 330 measures an environmental temperature inside the image forming apparatus 10.

The induction heating unit 400 includes an induction heater 410 using an induction heating (IH) method, and a heater control circuit 420. The induction heater 410 heats the fixing roller 310. The heater control circuit 420 controls the induction heater 410. The induction heater 410 employs the IH method to directly heat the fixing roller 310, so as to ensure the significant shorten warm-up time. The heater control circuit 420 adjusts an electric power supplied to the induction heater 410 in response to a command from the control unit 600.

The control unit 600 includes a main storage unit, such as a RAM and a ROM, and a control unit, such as a microprocessing unit (MPU) and a central processing unit (CPU). The control unit 600 has a controller function related to an interface, such as various I/Os, a universal serial bus (USB), a bus, and another hardware, and controls the whole image forming apparatus 10.

The control unit 600 further includes a real-time clock 610. The real-time clock 610 is a clock included in the control unit, and continues measuring a current time even when a power supply of the control unit is turned off. The measurement of time may be achieved, for example, by using a network to obtain information representing the time from the outside.

The storage unit 500 is a storage device that is constituted of, for example, a hard disk drive and a flash memory, which are non-transitory recording media, and stores a program that controls processing executed by the control unit 600, and data.

Figure 2:
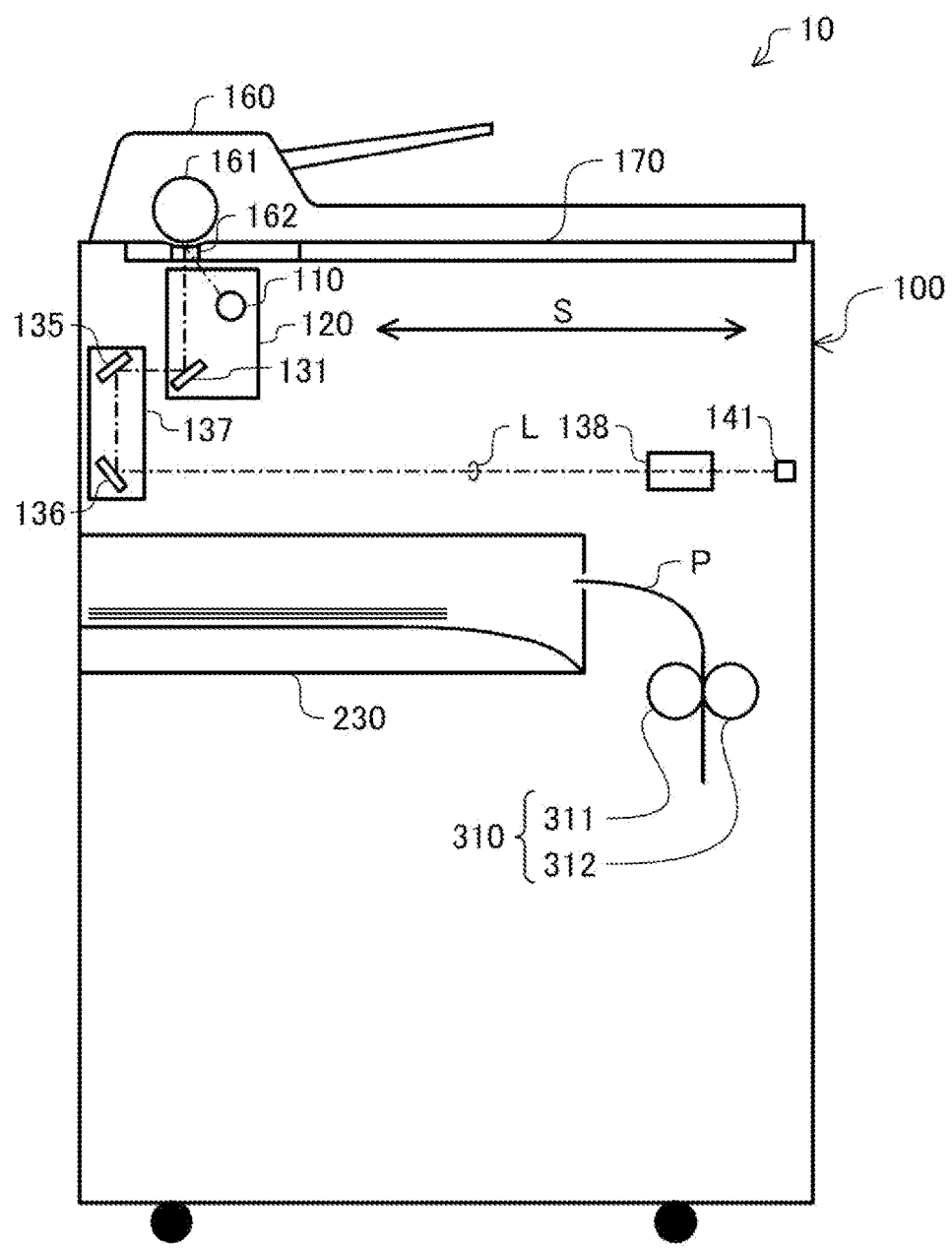
FIG. 2 illustrates a schematic configuration of an image reading unit according to the one embodiment.

FIG. 2 schematically illustrates a configuration of the image reading unit 100 according to the one embodiment. The image reading unit 100 includes an automatic document feeder (ADF) 160 and a platen 170, and reads the image from the original document to generate the image data as digital data. The image reading unit 100 includes a light source unit 110, a first reflecting mirror 131, a first carriage 120, a second reflecting mirror 135, a third reflecting mirror 136, a second carriage 137, a condensing lens 138, and an image sensor 141. The first reflecting mirror 131 reflects a reflected light L from the original document in a direction toward the second reflecting mirror 135. The second reflecting mirror 135 reflects the reflected light L in a direction toward the third reflecting mirror 136. The third reflecting mirror 136 reflects the reflected light L in a direction toward the condensing lens 138. The condensing lens 138 forms images with the reflected light L on a light receiving surface of the image sensor 141.

The first carriage 120 includes the light source unit 110 and the first reflecting mirror 131, and reciprocates in a sub-scanning direction S. The second carriage 137 includes the second reflecting mirror 135 and the third reflecting mirror 136, and reciprocates in the sub-scanning direction S. The first carriage 120 and the second carriage 137 are a part of a scanning mechanism controlled by the control unit 600. The light source unit 110 enables scanning the original document in the sub-scanning direction S. This causes the image sensor 141 to output an analog electrical signal corresponding to a two-dimensional image on the original document placed on the platen 170, and then an A/D conversion is performed on this analog electrical signal. Thus the image data is generated. The first carriage 120 is also simply referred to as a running body.

The ADF 160 ensures placing a plurality of original documents, conveys the original documents one by one, and then images are automatically read. When the automatic document feeder (ADF) 160, which automatically conveys the original document, is used, the first carriage 120 and the second carriage 137 are fixed to predetermined sub-scanning positions to perform scanning by an automatic conveyance of the original documents. The ADF 160 may read not only a single-side but also simultaneously or sequentially read both sides.

The ADF 160 includes a paper feed roller 161 and a document reading slit 162. The paper feed roller 161 performs the automatic conveyance of the original documents, and the original documents are read via the document reading slit 162. In this case, the first carriage 120 is fixed to the predetermined sub-scanning position. This means that the light source unit 110, which is included in the first carriage 120, is also fixed to a predetermined position.

Thus, the first carriage 120 is located at the proximity of the ADF 160 as an initial position. On the other hand, the condensing lens 138 is located to be fixed to the proximity of the image sensor 141 located at a position in a side opposite to the ADF 160.

In the image forming apparatus 10, a sheet discharge tray 230 and the fixing roller 310 are located below the image reading unit 100. The sheet discharge tray 230 is located on the ADF 160 side in a horizontal direction. The fixing roller 310 is located on the image sensor 141 side in the horizontal direction.

The fixing roller 310 includes a pair of rollers, namely, a pressing roller 311 and a heating roller 312. The pressing roller 311 and the heating roller 312 contact in a state where the pressing roller 311 and the heating roller 312 mutually apply pressure to be deformed, so as to form a nip portion (not illustrated). When a print medium P passes through this nip portion, applying pressure and heating are performed on the print medium P to fix the toner. The print medium P, on which the toner has been fixed, is discharged by the sheet discharge tray 230.

Figure 3:
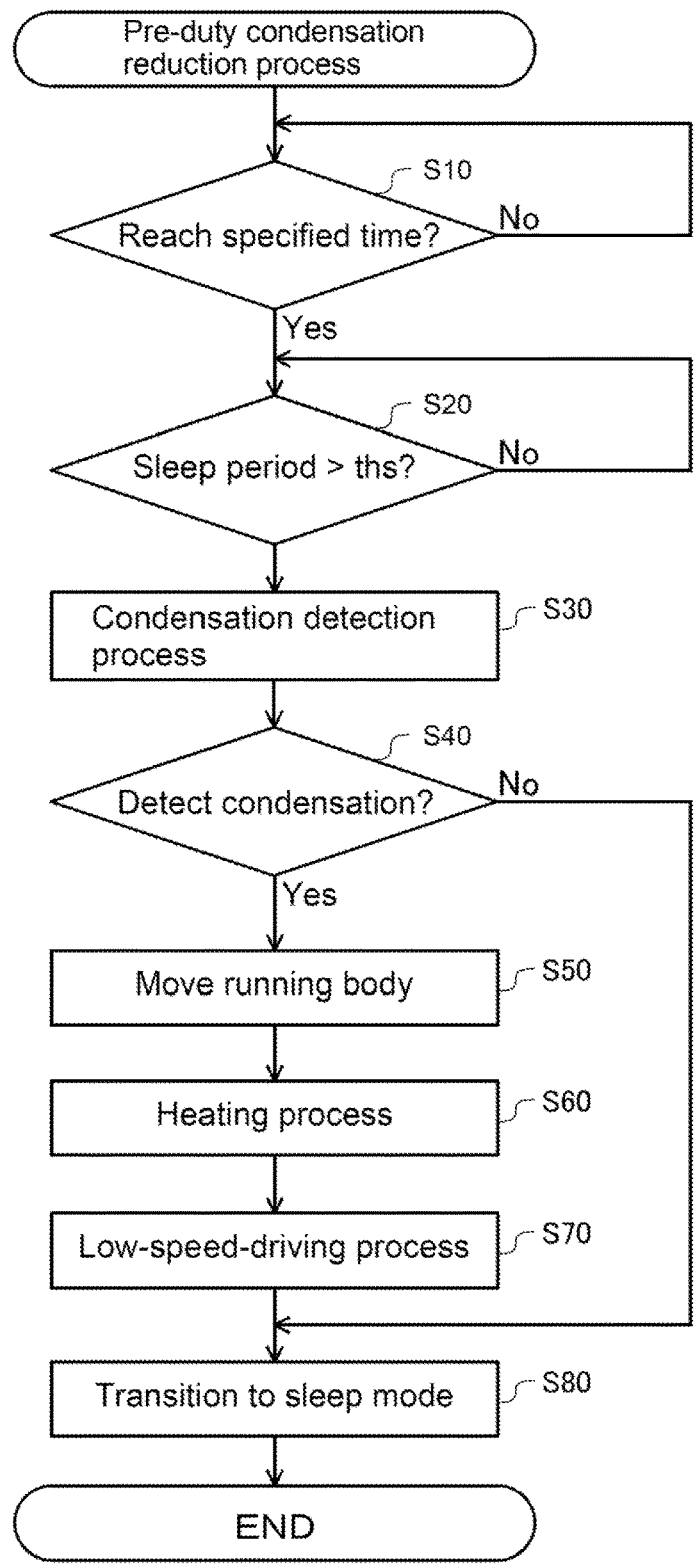
FIG. 3 illustrates contents of a pre-duty condensation reduction process according to the one embodiment.

FIG. 3 illustrates contents of a pre-duty condensation reduction process according to the one embodiment. The pre-duty condensation reduction process is a process that preliminarily reduces condensation before start working so as to use the image forming apparatus 10 without a condensation removal process or after a condensation removal process in a short time at a time of the start of work.

At Step S10, the control unit 600 uses the real-time clock 610 to detect reaching a predetermined specified time, so as to start. The specified time is set as a predetermined time (for example, before 30 minutes) prior to a predetermined time of starting work (for example, 9 a.m.). A setting of the time of starting work (also referred to as an estimated start-of-use time) is performed using, for example, an operation control unit (also referred to as a time setting unit, not illustrated) of the image forming apparatus 10.

At Step S20, the control unit 600 determines whether a sleep period is longer than a predetermined threshold the or not. This is because condensation does not occur until a certain-long-sleep period passes. The control unit 600 may further use a value measured by the environmental temperature sensor 330 that measures an environmental temperature in the image forming apparatus 10 to calculate a temperature reduction during the sleep period, so as to estimate a possibility of condensation. In this case, the control unit 600 records the minimum temperature in the sleep period, compares the minimum temperature with a temperature at a time of use to estimate that there is a possibility of condensation if there is a predetermined temperature difference. This is because when the image forming apparatus 10 is turned on, a warm air including water vapor flows into the apparatus, this warm air (temperature at a time of use) touches the optical system of the image reading unit 100 and decreases in temperature by the predetermined temperature difference, and then the condensation occurs.

At Step S30, the control unit 600 performs a condensation detection process. The condensation detection process performs, for example, as follows. The image reading unit 100 detects condensation in a calibration process. Specifically, in the calibration process, the image reading unit 100 moves the first carriage 120 to irradiate a white plate for calibration (not illustrated) with a light, so as to obtain the image data.

The control unit 600 analyzes the obtained image data. If the image is excessively dark, the control unit 600 determines that the condensation occurs in the optical system of the image reading unit 100 to cause the irradiated light to scatter because of water droplets. Thus, the control unit 600 ensures performing the condensation detection process. A method for the condensation detection is not limited to such method. For example, a scanning-wise traversing thin line (not illustrated) for detecting condensation may be located on the white plate. Thus the control unit 600 causes the optical system of the image reading unit 100 to read this thin line to ensure determining that condensation occurs in the optical system of the image reading unit 100 when a width of the read line is thicker than a predetermined reference. Not limited to such method, a method for a condensation detection process can be appropriately selected for an apparatus.

At Step S40, when having determined that the condensation occurs, the control unit 600 advances the process to Step S50. When having determined that the condensation does not occur, the control unit 600 advances the process to Step S80 to return the image forming apparatus 10 into a sleep mode (also referred to as a sleep state).

Figure 4:
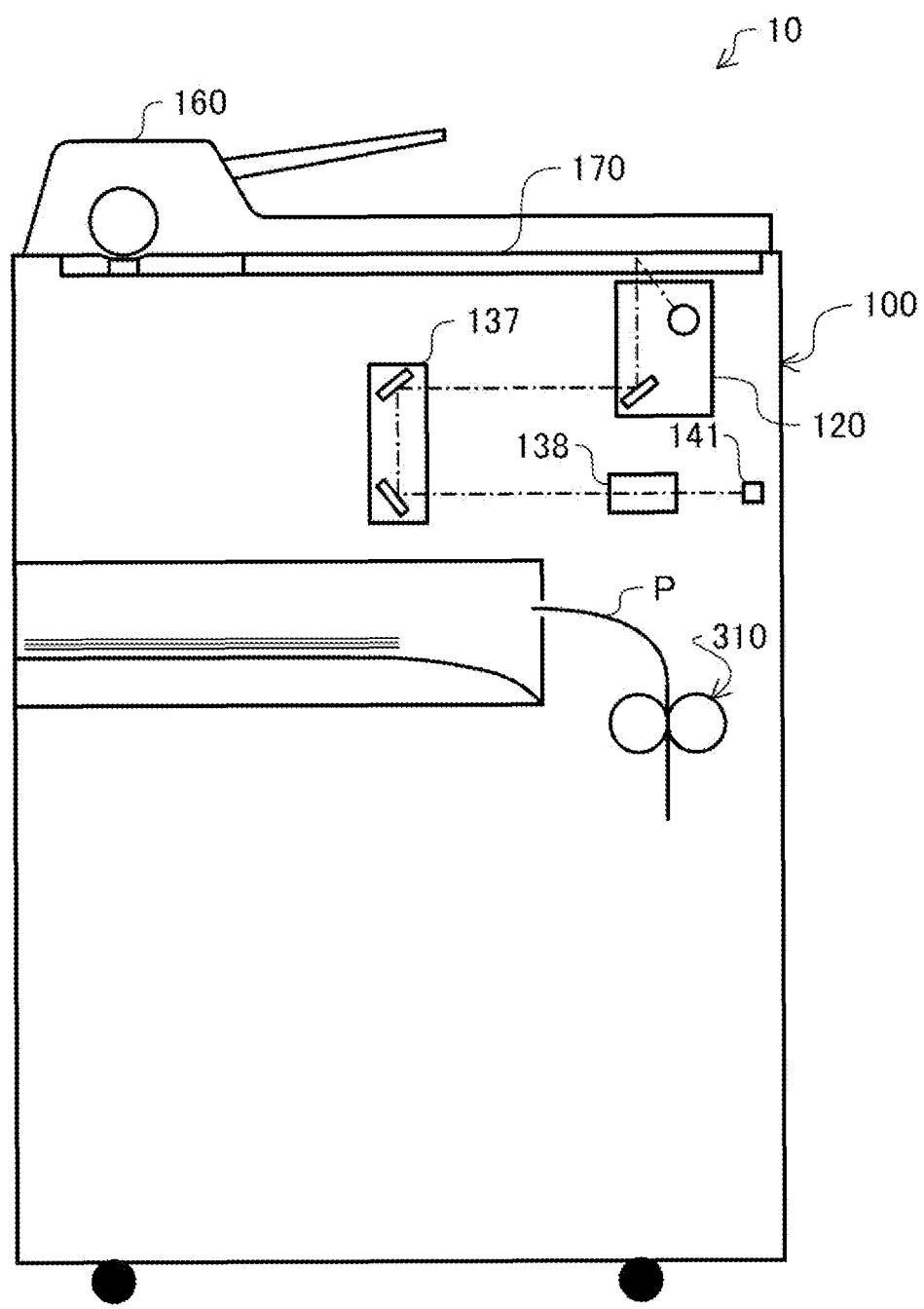
FIG. 4 illustrates an operating state during a condensation removal of the image reading unit according to the one embodiment.

FIG. 4 illustrates an operating state during a condensation removal of the image reading unit 100 according to the one embodiment. At Step S50, the control unit 600 controls the image reading unit 100 to move the first carriage 120 to above the fixing roller 310. The movement of the first carriage 120 is performed in a movement mode where its speed is lower than a scanning speed, so as to reduce an operating noise. Because a user has uncomfortable feeling when an operating noise occurs from the image forming apparatus 10 without any operation before the time of starting work. Since outside air flowing into the apparatus may cause the condensation, it is preferred that a fan for cooling devices inside (not illustrated) and similar unit be stopped.

At Step S60, the control unit 600 starts heating the fixing roller 310. Specifically, assume that a temperature range of, for example, 170° C. (the lower limit temperature) to 190° C. (the upper limit temperature) is set as a fixing temperature of the fixing roller 310. In the case of heating in order to remove condensation, the control unit 600 starts a heating control with the target temperature of 190° C. (the upper limit temperature). The target temperature is set to 190° C. (the upper limit temperature) because a thermal efficiency of the fixing roller 310 is intentionally reduced, that is, a proportion of a heat transfer amount from the fixing roller 310 to air is increased. While a usual operation operates the fan for cooling devices inside (not illustrated) to cool an inside of the apparatus when a temperature in the apparatus is raised, the fan for cooling devices inside (not illustrated) may be configured not to rotate as necessary to prevent outside air from flowing into the apparatus during an operation of this condensation removal.

This heating control is easily archived, for example, by using a control method, such as a well-known PID control and PI control. In the heating control, a measured temperature of the fixing temperature sensor 320 is used as a feedback amount. On the other hand, a measured value of the environmental temperature sensor 330 is used for correcting a heat amount emitted until reaching the target temperature. The control unit 600 stops the heating after a lapse of a predetermined period in advance (for example, one minute after reaching the target temperature).

At Step S70, the control unit 600 starts a low-speed driving of the fixing roller 310 simultaneously with, for example, a start of the heating. The control unit 600 rotates the pressing roller 311 and the heating roller 312 of the fixing roller 310 at a speed lower than a rotation speed at a time of the fixing process. Rotating the pressing roller 311 and the heating roller 312 transmits a heat of the heating roller 312 to the pressing roller 311 so as to enhance the heat radiation effect from the pressing roller 311 to air. Rotating at a low speed ensures the reduced operating noise.

A method for the condensation removal includes a method where lighting the light source unit 110 directly heats the optical system. However, this gives an uncomfortable feeling to the user when a light leaks from the image forming apparatus 10 for a long period without any operation before the time of starting work. Thus the control unit 600 is configured to drive the fixing roller 310 at a low speed to remove the condensation without giving uncomfortable feeling to the user. The low-speed driving of the fixing roller 310 may continue even after the heating (for example, 20 minutes). This ensures the effective use of thermal energy of the fixing roller 310.

This causes the fixing roller 310 to heat and move up air in the image forming apparatus 10. The heated air has a reduced relative humidity, and this causes the condensation of the onboard optical system in the first carriage 120, the image sensor 141, and the condensing lens 138 to vaporize. Air absorbing water vapor from, for example, the first carriage 120 moves to the ADF 160 side to move down after passing the second carriage 137. This causes annular airflow circulating in the image forming apparatus 10.

Thus, the fixing roller 310 generates the annular airflow circulating in the image forming apparatus 10 and raises its temperature. Then, the air with a low relative humidity continuously removes the condensation from the condensing lens 138, the first carriage 120, the image sensor 141, and the second carriage 137. Even after the heating is stopped, the fixing roller 310 may continue heating the air to continue the condensation removal until the time of starting work.

In related art, the condensation removal is performed at a time when a user attempts to use. This causes a trade-off problem between a reduced period of the condensation removal, and energy efficiency. In this embodiment, a predetermined time (for example, before 30 minutes) of Step S10 is arbitrarily set so as to remove the condensation using a sufficient period for the condensation removal in a small heating amount.

At Step S70, the control unit 600 returns the image forming apparatus 10 into the sleep mode. This enables the user to use the image forming apparatus 10 without waiting for the condensation removal process for a long time.

Thus, the image forming apparatus 10 according to the embodiment effectively uses a time before start working to enable the condensation removal with a simple configuration while preventing convenience of the user from being reduced.

In this configuration, the detection process of condensation is performed again during a calibration of the image reading unit 100 during the power on of the image forming apparatus 10. In this case, even while the condensation may not be sufficiently removed until the power supply is turned on, it is advantageous in that a period of the condensation removal is significantly reduced.

The control unit 600 may be configured to perform an additional condensation removal process as necessary after automatically performing the detection process of condensation at a time of starting work (for example, 9 a.m.).

The disclosure is not limited to the above-described embodiment and embodied as the following modifications.

Modification 1

In the above-described embodiment, an operation display (not illustrated) may display "Performing condensation removal process now. Not ready for copying." until the transition to the sleep mode (Step S80) from the running body movement (Step S50).

Modification 2

While in the above-described embodiment the running body as a part of the optical system is moved to above the fixing roller, it is not necessary for the running body to be moved to above the fixing roller. The running body may be brought close to above the fixing roller. Furthermore, in a configuration where the running body is located above the fixing roller in an initial state, it is not necessary to move the running body. Even in a configuration where the running body is separated from above the fixing roller in the initial state, movement of the running body is not an essential configuration.

Modification 3

While in the above-described embodiment a measured value of the environmental temperature sensor is used for correcting a heat amount emitted until reaching a target temperature and estimating a possibility of condensation, also used for, for example, determining a heating period of the fixing roller. Specifically, for example, when the measured value of the environmental temperature sensor is low at a time of reaching a specified time, the heating period (for example, a heating period after reaching the target temperature) of the fixing roller may be set to be long.

Modification 4

While in the above-described embodiment the upper limit temperature of the fixing temperature of the fixing roller is set as the target temperature in the case of heating in order to remove condensation, it is only necessary that the target temperature is in a range of the fixing temperature of the fixing roller. However, in order to emit the heat effectively from the fixing roller to air, the control unit may perform a control for heating using a temperature higher than the center of the range of the fixing temperature set as a target value.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming apparatus for forming an image on a print medium, the image forming apparatus comprising:
   an image reading unit including a scanning mechanism that performs scanning by moving a running body having an onboard optical system;
   a fixing unit that heats toner transferred onto the print medium and applies pressure on the heated toner with respect to the print medium to fix the toner;
   a time setting unit that sets an estimated time when use of the image forming apparatus starts; and
   a control unit that controls the image reading unit, the fixing unit, and the time setting unit; wherein
   the control unit, prior to the set estimated start-of-use time by a predetermined period set in advance, activates the image reading unit to detect whether condensation has occurred in the optical system, heats the fixing unit in response to a detection of occurrence of condensation, and stops the heating before the estimated start-of-use time.

2. The image forming apparatus according to claim 1, wherein:
   the fixing unit includes a pair of rollers; and
   the control unit rotates the pair of rollers at a rotation speed lower than a rotation speed of the pair of rollers in a fixing process of the fixing unit, to remove condensation.

3. The image forming apparatus according to claim 2, wherein the control unit stops the rotation of the pair of rollers before the estimated start-of-use time.

4. The image forming apparatus according to claim 1, wherein the control unit performs heating and sets, as a target value, a temperature higher than a center of a range of a fixing temperature in the fixing process by the fixing unit.

5. The image forming apparatus according to claim 1, further comprising:
   an environmental temperature sensor that measures an environmental temperature of the image forming apparatus; wherein
   the control unit causes the environmental temperature sensor to measure a temperature of the image forming apparatus in a sleep state before the activation, and detects whether condensation occurs in the optical system when a temperature difference between a minimum temperature in the sleep state and a temperature at a time of the activation is equal to or more than a predetermined temperature difference.

6. The image forming apparatus according to claim 1, further comprising:
   a white plate for calibration on which a scanning-wise traversing line is displayed; wherein
   the control unit causes the image reading unit to read the white plate, and when a width of the read line is wider than a predetermined width, determines that condensation has occurred in the optical system.

7. The image forming apparatus according to claim 1, wherein the control unit moves the running body as a part of the optical system of the image reading unit to bring the running body close to the fixing unit when heating the fixing unit.

8. The image forming apparatus according to claim 7, wherein the control unit performs the movement to bring the running body close to the fixing unit at a speed slower than a scanning speed at a time of reading an image by the image reading unit.

9. A method for reducing condensation in an image forming apparatus that includes a running body having an onboard optical system, a fixing unit, and a time setting unit, and that forms an image on a print medium, the method comprising:
   performing scanning by moving the running body;
   heating toner transferred onto the print medium and applying pressure on the heated toner with respect to the print medium to fix the toner by the fixing unit;
   setting an estimated time when use of the image forming apparatus starts via the time setting unit;
   detecting whether condensation has occurred in the optical system by performing the scanning prior to the set estimated start-of-use time by a predetermined period set in advance;
   heating the fixing unit in response to a detection of occurrence of condensation; and
   stopping the heating of the fixing unit before the estimated start-of-use time.

10. A non-transitory computer-readable recording medium storing a control program for controlling an image forming apparatus that forms an image on a print medium, the image forming apparatus including
   an image reading unit including a scanning mechanism that performs scanning by moving a running body having an onboard optical system,
   a fixing unit that heats toner transferred onto the print medium and applies pressure on the heated toner with respect to the print medium to fix the toner, and
   a time setting unit that sets an estimated time when use of the image forming apparatus starts; wherein the control program causes the image forming apparatus to function as a control unit that controls the image reading unit, the fixing unit, and the time setting unit; and the control unit, prior to the set estimated start-of-use time by a predetermined period set in advance, activates the image reading unit to detect whether condensation has occurred in the optical system, heats the fixing unit in response to a detection of occurrence of condensation, and stops the heating before the estimated start-of-use time.

\* \* \* \* \*